United States Patent
Li

(10) Patent No.: US 9,459,692 B1
(45) Date of Patent: Oct. 4, 2016

(54) VIRTUAL REALITY HEADSET WITH RELATIVE MOTION HEAD TRACKER

(71) Applicant: Ariadne's Thread (USA), Inc., Solana Beach, CA (US)

(72) Inventor: Adam Li, Solana Beach, CA (US)

(73) Assignee: ARIADNE'S THREAD (USA), INC., Solana Beach, CA (US)

( * ) Notice: Subject to any disclaimer, the term of this patent is extended or adjusted under 35 U.S.C. 154(b) by 0 days.

(21) Appl. No.: 15/084,327

(22) Filed: Mar. 29, 2016

(51) Int. Cl.
| G09G 5/00 | (2006.01) |
| G06F 3/01 | (2006.01) |
| G06T 19/00 | (2011.01) |
| G06T 7/00 | (2006.01) |
| G06F 3/03 | (2006.01) |
| G06T 7/20 | (2006.01) |
| G06F 3/0346 | (2013.01) |
| G01S 19/13 | (2010.01) |

(52) U.S. Cl.
CPC .............. *G06F 3/012* (2013.01); *G01S 19/13* (2013.01); *G06F 3/0304* (2013.01); *G06F 3/0346* (2013.01); *G06T 7/0044* (2013.01); *G06T 7/20* (2013.01); *G06T 19/006* (2013.01)

(58) Field of Classification Search
None
See application file for complete search history.

(56) References Cited

U.S. PATENT DOCUMENTS

| 5,841,439 | A | 11/1998 | Pose et al. |
| 6,445,815 | B1 | 9/2002 | Sato |
| 2001/0010598 | A1 | 8/2001 | Aritake et al. |
| 2010/0053164 | A1* | 3/2010 | Imai ................. G06F 3/011 345/427 |
| 2011/0018903 | A1 | 1/2011 | Lapstun et al. |
| 2012/0320088 | A1* | 12/2012 | Ihara ................. G05B 23/0216 345/629 |
| 2014/0049983 | A1 | 2/2014 | Nichol et al. |
| 2014/0146394 | A1 | 5/2014 | Tout et al. |
| 2014/0266990 | A1 | 9/2014 | Makino et al. |
| 2014/0327667 | A1 | 11/2014 | Kim et al. |
| 2015/0097858 | A1 | 4/2015 | Miki et al. |
| 2015/0100179 | A1* | 4/2015 | Alaniz .................. A63F 13/00 701/1 |
| 2015/0153575 | A1 | 6/2015 | Komatsu et al. |
| 2015/0219899 | A1 | 8/2015 | Mack et al. |
| 2015/0294505 | A1* | 10/2015 | Atsmon ............... G06T 19/006 345/633 |
| 2016/0116748 | A1* | 4/2016 | Carollo ................ G02B 27/017 345/8 |

* cited by examiner

*Primary Examiner* — David H Chu
(74) *Attorney, Agent, or Firm* — ARC IP Law, PC; Joseph J. Mayo

(57) ABSTRACT

A virtual reality headset that tracks motion of a user relative to a moving vehicle in which the user is located. The system updates the headset's display based on relative motion, rather than on absolute motion due to vehicle movement. Data from sensors on the headset, the vehicle, or both is analyzed to determine the pose (orientation, position, or both) of the headset relative to the vehicle. Sensors may include headset-mounted cameras that observe the vehicle's interior from the user's viewpoint. Analysis of camera images may use optical flow or it may compare images to reference images captured from known poses. The system may also combine data from headset sensors and vehicle sensors to calculate the relative pose. Headset-mounted cameras may function both as relative pose sensors for virtual reality, and as image capture devices for display of the real environment on the headset.

22 Claims, 8 Drawing Sheets

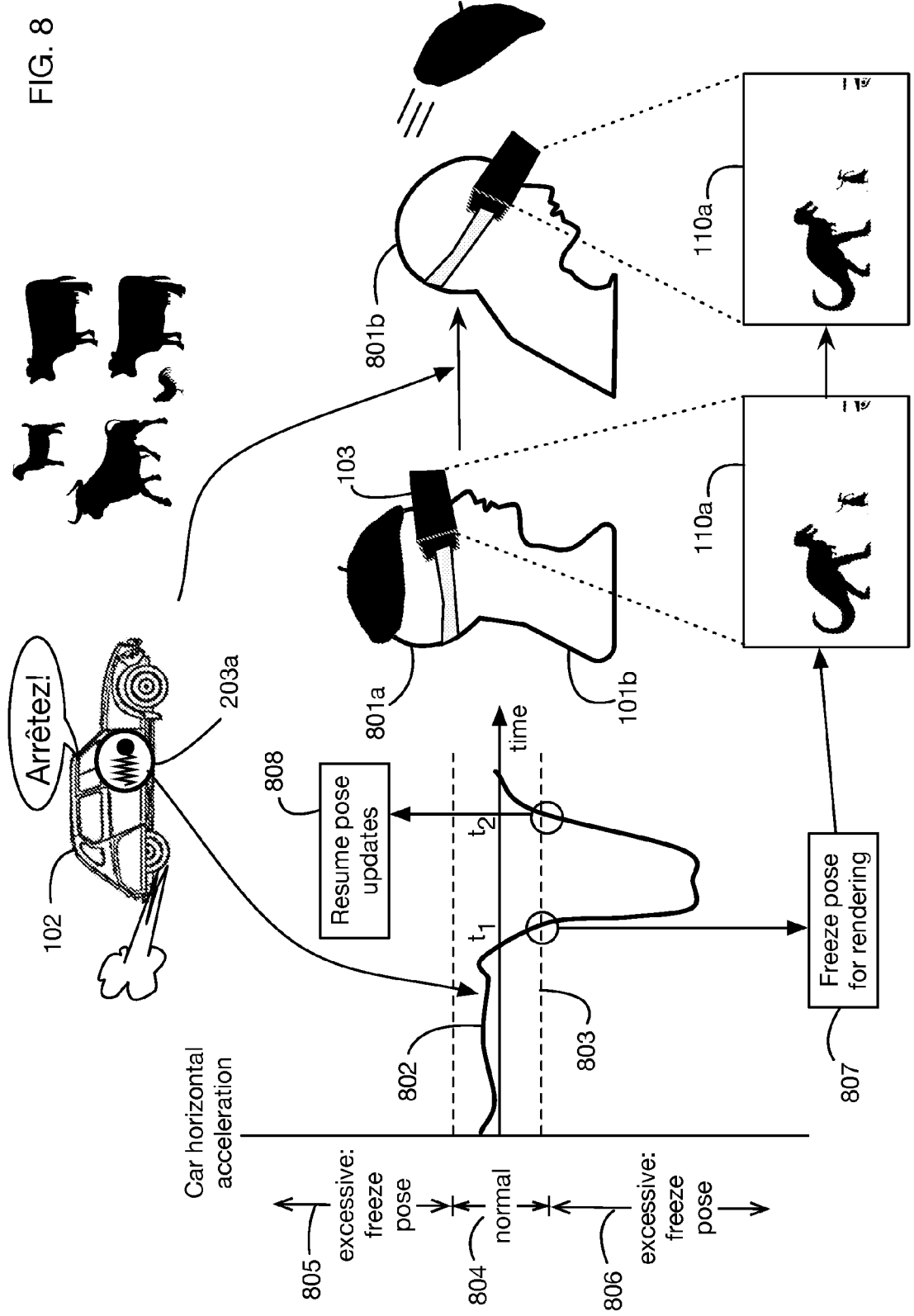

VIRTUAL REALITY HEADSET WITH RELATIVE MOTION HEAD TRACKER

BACKGROUND OF THE INVENTION

1. Field of the Invention

One or more embodiments of the invention are related to the field of virtual reality systems. More particularly, but not by way of limitation, one or more embodiments of the invention enable a virtual reality headset that tracks motion of a user's head relative to a vehicle, and that renders a virtual reality display based on this relative motion.

2. Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model are generated based on the user's position and orientation. Generation of these images may require rendering of the three-dimensional model onto one or more two-dimensional displays.

Many virtual reality systems known in the art use sensors that measure movement of a user's head relative to a fixed reference frame such as the Earth. For example, virtual reality headsets may use inertial sensors, such as accelerometers and gyroscopes, and magnetometers. While these sensors may work well for a user in a stationary environment such as a room, they do not work correctly when the user is in a moving vehicle. As the vehicle changes position and orientation, for example when a car goes around a curve, the headset sensors interpret the vehicle motion as motion of the headset. The virtual reality system then updates the display to reflect this apparent motion. This change in display is confusing for the user, since the user did not deliberately make a motion of his or her head. There are no known virtual reality systems that correctly measure the head motion of a user while the user is in a moving vehicle. A correct measurement of head motion while in a vehicle should track the motion of the head relative to the vehicle, rather than the absolute head motion relative to a fixed frame such as the Earth.

For at least the limitations described above there is a need for a virtual reality headset with a relative motion head tracker.

BRIEF SUMMARY OF THE INVENTION

One or more embodiments described in the specification are related to a virtual reality headset with a relative motion head tracker. Embodiments may track relative motion of the headset instead of (or in addition to) absolute motion of the headset. By tracking relative motion embodiments of the system may provide virtual reality displays that are responsive only to deliberate motions of a user within a moving vehicle, and that are not inadvertently affected by vehicle motion.

One or more embodiments of the invention include a virtual reality headset for a user in a moving vehicle. The headset may have one or more displays viewable by the user. The headset, the vehicle, or both may be equipped with one or more sensors that measure either or both of position and orientation, or any characteristics that vary based on position, orientation, or changes thereof. Position or orientation, or any combination or aspects thereof, are referred to as "pose" in this specification. Sensor data may be transmitted to a processor that analyzes the data to determine the pose of the headset relative to the vehicle. Based on this relative pose, the processor may generate, retrieve, select, or modify one or more display images, and transmit these images to the display or displays of the headset. For example, the processor may select a viewpoint in a virtual reality scene based on the headset pose relative to the vehicle, and may generate one or more images based on this viewpoint.

One or more embodiments may provide tracking of relative motion for a headset worn by a user in or on any type of vehicle, including for example, without limitation, a car, a truck, a bus, a motorcycle, a sidecar, a carriage, a train, a subway, a trolley, a tram, an airplane, a balloon, a dirigible, a hang glider, a space station, a space ship, a rocket, a boat, a submarine or any other type of object that moves in which a user may also move when the object moves.

One or more embodiments may use any type or types of sensors on the headset, on the vehicle, or both. In one or more embodiments, sensors may include one or more cameras mounted on the headset and oriented to capture images of the vehicle from the viewpoint of the headset. For example, for a headset on a user in a car, the headset-mounted camera or cameras may capture images that show the interior of the car as viewed by the user. The system may analyze these images to calculate the pose of the headset relative to the vehicle. For example, if the headset is not moving relative to the vehicle, images of the vehicle captured by a headset-mounted camera may be relatively static, even when the vehicle is moving; these static images indicate that the relative pose is not changing. This enables a user of one or more embodiments to appear to look forward in the virtual reality environment when the vehicle turns, which other known devices register as the user turning in the environment. This is the case since known devices may utilize gyroscopic or magnetic sensors that appear to indicate that the user is turning in an absolute sense as opposed to the user maintaining a straight forward viewpoint when the vehicle is turning.

Image analysis to determine relative motion may for example calculate optical flow from a time series of images, and use known techniques to estimate camera egomotion from the optical flow. Another approach that may be used instead of or in addition to analysis of optical flow is to compare a camera image to a database of reference images with known camera poses. For example, one or more embodiments may select a reference image that mostly closely matches a current image captured by a headset-mounted camera, and then calculate a transformation that maps the reference image into the current image. Applying this transformation to the pose associated with the reference image yields the current pose of the headset-mounted camera, and hence the pose of the headset relative to the vehicle.

One or more embodiments may construct a database of reference images using a headset-mounted camera along with other sensors on the headset that measure the headset pose. For example, a user may generate reference images by pointing the headset in various directions; the other sensors on the headset may be used to determine the camera pose for each reference image. Alternatively, or in addition, a panoramic image of the vehicle interior may provide a reference image database, or a three dimensional model of the vehicle interior may be available for example from the vehicle manufacturer.

In addition to or instead of using headset-mounted cameras to determine the headset's pose relative to the vehicle, one or more embodiments may combine data from headset sensors and from vehicle sensors to calculate the relative pose. For example, sensors on the headset and sensors on the vehicle may provide the pose of each relative to an external reference frame, such as the Earth for example. These poses relative to the external frame may then be combined to obtain the pose of the headset relative to the vehicle. Sensors on the headset, the vehicle, or both, may include for example, without limitation, accelerometers, gyroscopes, magnetometers, GPS receivers, and cameras. For example, the vehicle pose relative to the external environment may be obtained from one or more vehicle-mounted cameras, potentially in conjunction with other sensors such as inertial sensors or magnetometers.

One or more embodiments may use a camera or cameras mounted on the headset for multiple functions, depending on an operating mode for the system selected for example by the user. In "virtual reality" mode, a camera may function as a sensor to detect the relative pose of the headset relative to the vehicle, as described above. One or more embodiments may also support "real" or "augmented reality" modes, wherein camera images are displayed directly on the headset display. In augmented reality mode the system may modify or augment camera images prior to display, for example by adding annotations or graphics. These modes and functions are illustrative; any embodiment that uses a headset-mounted camera both as a pose sensor and for capture of images to be displayed to the user is in keeping with the spirit of the invention.

Sudden acceleration or deceleration of a vehicle may cause a user's head to move inadvertently, changing the virtual reality display unintentionally for the user. Therefore, one or more embodiments of the invention may detect when the acceleration of the vehicle is outside a normal range, and may suspend updates to the relative pose of the headset until the vehicle acceleration returns to a normal range.

BRIEF DESCRIPTION OF THE DRAWINGS

The above and other aspects, features and advantages of the invention will be more apparent from the following more particular description thereof, presented in conjunction with the following drawings wherein:

FIG. 8 illustrates an embodiment that temporarily freezes the headset pose used for display rendering when the vehicle acceleration is outside a normal range, in order to ignore inadvertent motion of the user's head in response to the vehicle acceleration.

DETAILED DESCRIPTION OF THE INVENTION

A virtual reality headset with a relative motion head tracker will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
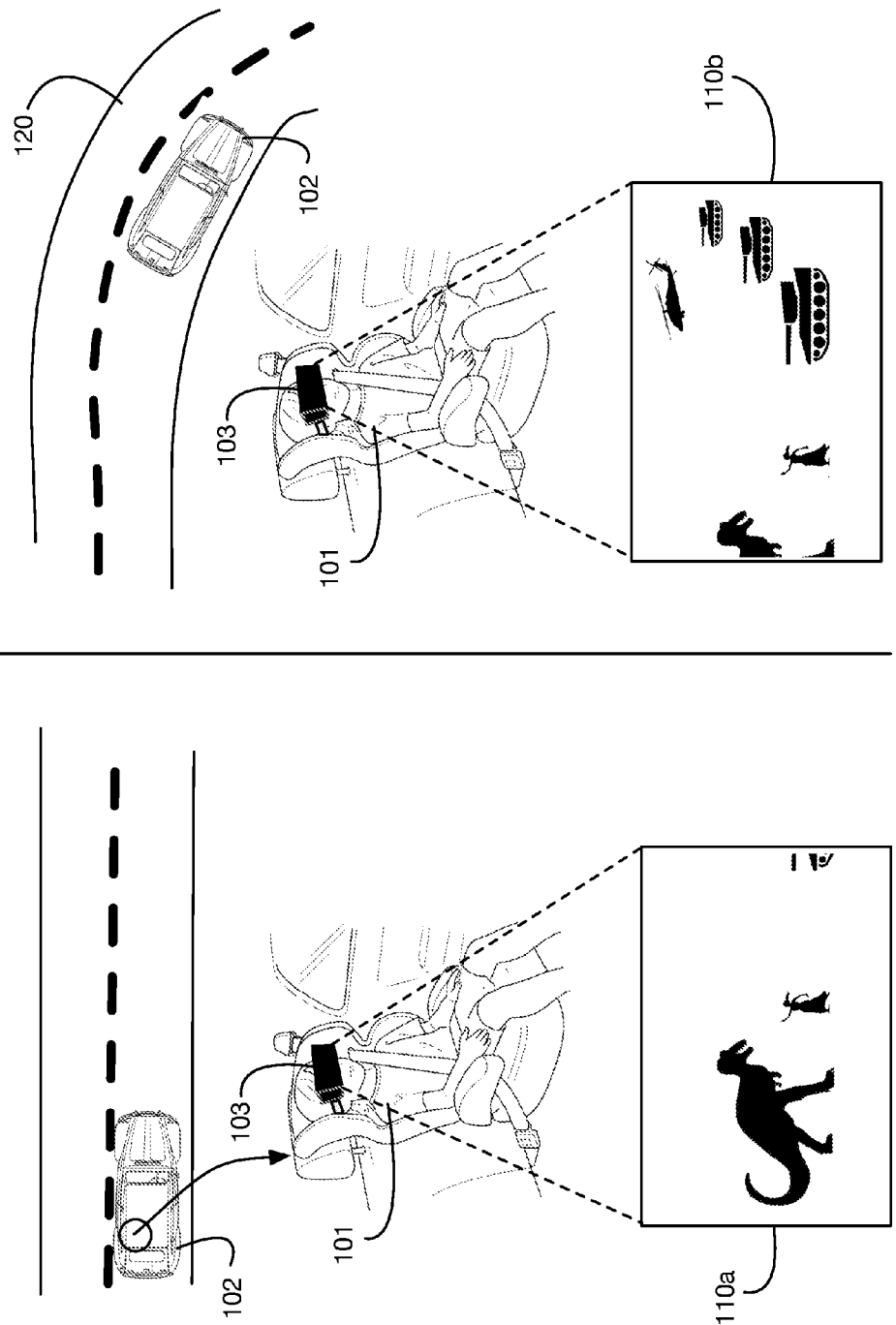
FIG. 1 illustrates a problem with the prior art that is addressed by embodiments of the invention: a virtual reality headset in a moving vehicle may sense motion of the vehicle rather than a deliberate head motion of the user, and may thereby inadvertently modify the virtual reality display.

FIG. 1 shows an example of a problem in the prior art that is addressed by one or more embodiments of the invention. User 101 wears a virtual reality headset 103. The user is located inside a moving vehicle 102. In frame A of FIG. 1, the vehicle 102 is travelling in a straight line at a constant velocity. Scene 110a is displayed on the display or displays of virtual reality headset 103. In frame B, vehicle 102 goes around a curve 120. Although the user 101 has not purposely moved his or her head, the virtual reality headset 103 detects motion of the vehicle 102 and interprets this as head motion. Therefore, the scene displayed on the headset changes to 110b, reflecting the apparent change in the user's orientation. This change confuses user 101, since the user did not deliberately look in a different direction at the virtual scene. The problem illustrated in FIG. 1 is caused by the sensors in headset 103, which detect absolute motion of the headset instead of motion relative to vehicle 102.

Figure 2:
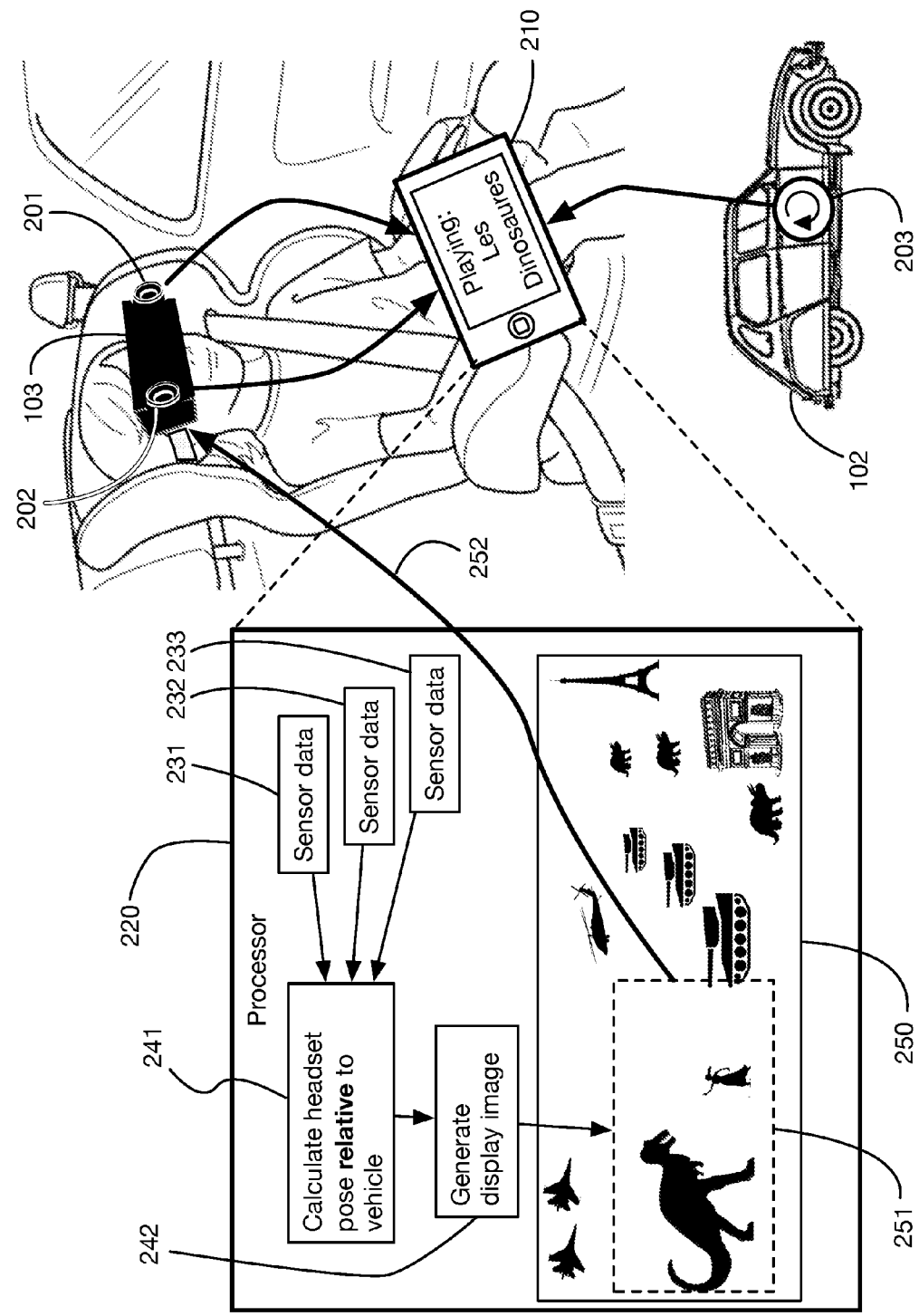
FIG. 2 shows an architectural block diagram of an embodiment of the invention that uses sensors to measure motion of the headset relative to the vehicle.

FIG. 2 illustrates a block diagram of an embodiment of the invention that addresses the problem shown in FIG. 1. One or more embodiments use sensors in either or both of the headset and the vehicle to determine the motion of the headset relative to the vehicle. Sensor data from one or more sensors is combined and analyzed to calculate the pose of the headset 103 relative to the vehicle 102. The term "pose" comprises position, orientation, or both position and orientation. In one or more embodiments sensors may measure any aspect of pose, including any characteristic or characteristics that vary based on the pose or on changes to the pose.

In the embodiment illustrated in FIG. 2, headset 103 includes two camera sensors 201 and 202 that capture images of the interior of vehicle 102 where the user is located. One or more embodiments may have any number of cameras on headset 103, e.g., one or more; the camera or cameras may face in any direction and capture any desired field of view. Camera sensors are illustrative; one or more embodiments may use any type or types of sensors, including for example, without limitation, cameras, video cameras, infrared cameras, accelerometers, gyroscopes, magnetometers, GPS receivers, ultrasonic rangefinders, laser rangefinders, radars, pressure sensors, or inclinometers. In the embodiment shown in FIG. 2, vehicle 102 also has a sensor 203, which may for example be of any of the sensor types listed above. One or more embodiments may use only sensors on the headset and may not require any sensor on the vehicle. Conversely one or more embodiments may use only sensors in the vehicle and may not require any sensor on the headset. Data from sensors 201, 203, and 203, or any subset thereof, is transmitted to a device 210, which may for example be a mobile device such as a tablet computer or a mobile phone. In the example shown in FIG. 2, sensor data is transmitted wirelessly to tablet 210. One or more embodiments may transmit sensor data over any wireless or wired network or networks to any device or devices for analysis. In one or more embodiments the device 210 may be integrated into headset 103 or integrated into vehicle 102.

Device 210 contains a processor 220 that analyzes sensor data to determine the headset pose relative to the vehicle. One or more embodiments may use any type or types of processor, including for example, without limitation, microprocessors, microcontrollers, digital signal processors, coprocessors, analog circuits, multiprocessors, arrays or networks of other processors, mobile phones, smart phones, smart watches, tablet computers, laptop computers, desktop computers, servers, or combinations or networks of any of these processors. Sensor data such as data 231 from sensor 201, data 232 from sensor 202, and data 233 from sensor 203, are transmitted to a module 241 integrated into or executing on processor 220; this module calculates the pose of headset 103 relative to the vehicle 102. This relative pose is transmitted to a module 242 that generates one or more display images to be shown on headset 103. Headset 103 includes one more displays viewable by the user. (In the embodiment of FIG. 2 the display or displays are located inside device 103, and hence are not visible.) The processor 220 has access to a virtual reality environment 250, and it selects or generates images of this environment based on the relative pose calculated by module 241. For example, in the embodiment shown in FIG. 2, module 242 selects image 251 that shows a portion of the virtual reality environment 250; the specific portion selected corresponds to the relative pose of the headset in the vehicle. This image 251 is then transmitted 252 to the headset 103. In one or more embodiments any or all of the modules 241 and 242 and the virtual reality environment 250 may be integrated into headset 103. Module 242 may generate or select image 251 by rendering a scene, or it may select or modify any desired portion of pre-rendered or captured images.

In one or more embodiments of the invention, images captured from a camera or cameras in the virtual reality headset may be used to calculate the headset pose relative to the vehicle. Camera images may be used by themselves or in conjunction with other sensor data. Techniques for determining the pose of a camera from one or more images captured by the camera are known in the art. Motion of a camera relative to the environment is referred to in the art as camera "egomotion." One or more embodiments may use any of the techniques known in the art for calculating or estimating camera egomotion in order to determine the pose of a headset relative to a vehicle. An overview of illustrative techniques known in the art is described for example in Cheda, Ponsa, and Lopez, "Camera Egomotion Estimation in the ADAS Context," 2010 13$^{th}$ International IEEE Annual Conference on Intelligent Transportation Systems. Techniques listed in this paper include for example optical flow techniques and feature matching techniques, which are described below.

Figure 3:
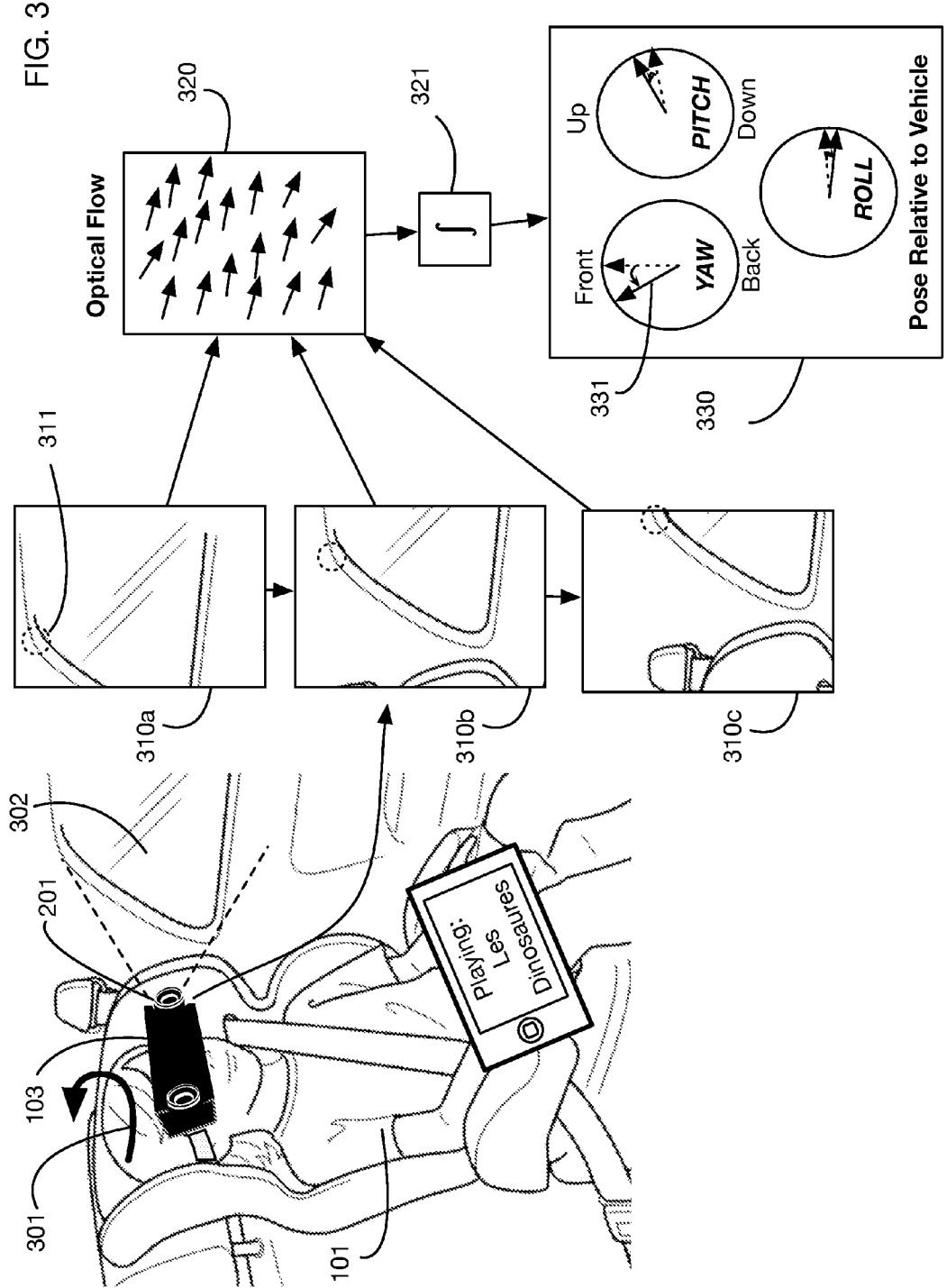
FIG. 3 shows an embodiment that uses a camera mounted on the headset to measure optical flow, and thereby to measure headset motion relative to the vehicle.

FIG. 3 illustrates an embodiment of the invention that uses optical flow techniques to calculate the headset pose relative to a vehicle, based on camera images captured from a camera on the headset. Camera 201 on headset 103 captures a series of images 310a, 310b, and 310c as the head of user 101 rotates 301 towards the left and upward within the vehicle. Camera 201 captures images of the interior of the vehicle, including for example images of the left side 302 of the vehicle. The left upwards rotating egomotion of the camera 201 creates an apparent rightward and downward motion of the pixels in successive images 310a, 310b, and 310c. For example, feature 311 on the rear window appears to move to the right and down. Using known techniques, one or more embodiments may calculate an optical flow field 320 from the motion of all or some of the pixels across frames, and determine changes in the camera pose (the camera egomotion) from the optical flow field 320. Pose changes derived from optical flow 320 can then be integrated 321, using known techniques, to derive the pose 330 of the headset relative to the vehicle. FIG. 3 illustrates three orientation axes for the pose 330, corresponding to roll, pitch, and yaw; the yaw for example moves leftwards to direction 331 as the head turns. One or more embodiments may determine one or more position axes in addition to or instead of orientation axes as shown in 330.

In one or more embodiments optical flow such as 320 may be calculated from only a subset of the pixels of the images. For example, one or more embodiments may identify selected features like window corner 311 and track only these features across frames. In one or more embodiments certain regions within images may be ignored or masked, for example if these regions show items other than the interior of the vehicle. For example, the external environment may be visible through the glass of window 302, and it may be preferable to ignore pixels corresponding to the window glass in calculating optical flow.

Figure 4:
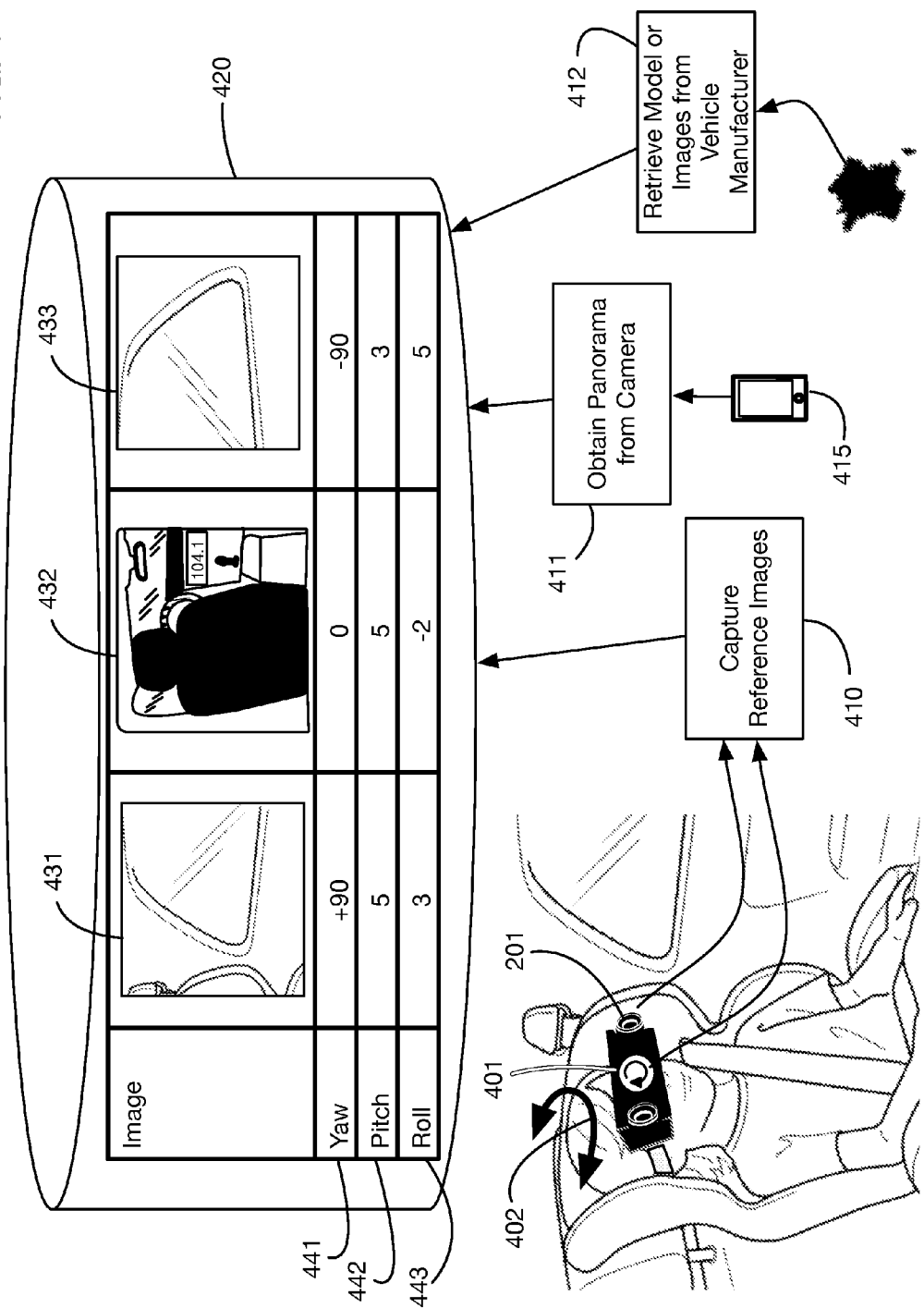
FIG. 4 illustrates an embodiment of the system that captures a series of reference images with the camera on the headset, or that obtains reference images from another source.

Instead of (or in addition to) use of optical flow, one or more embodiments may calculate the pose of the headset relative to the vehicle using one or more reference images. FIG. 4 illustrates an embodiment that uses this approach. A reference database 420 is created or retrieved; the database contains reference images viewed from the backseat of the vehicle, such as 431 of the left side of the car, 432 of the front driver's seat, and 433 of the right side of the car. For each reference image the corresponding pose of the camera is stored, for example as angles for yaw 441, pitch 442, and roll 443. One or more embodiments may also store position information for the camera in addition to orientation information. One or more embodiments may use the virtual reality headset itself to generate the reference database 420. For example, the camera 201 on the headset may capture the images 431, 432, and 433. To obtain the pose information (such as angles 441, 442, and 443), the headset may for example include one or more additional sensors, such as gyroscope 401. In one or more embodiments the user may initialize the reference database 420 by moving or rotating within the field of view, for example with a left and right motion 402; the headset may then capture reference images and use the additional sensors such as 401 to determine the pose of the headset at that time. If the sensors such as sensor 401 measure the headset pose relative to an external environment, they will be sensitive to vehicle motion, as explained above. However, the reference images and poses may be captured for example while the vehicle is stationary.

This procedure is illustrative; one or more embodiments may use any desired procedure to capture, generate, or retrieve database 420. For example, a camera 415 not attached to the headset may capture a series of images or a panoramic image 411, which may be used to generate reference database 420. A vehicle manufacturer or distributor may also provide images or models 412 of the interior of the vehicle, which may be used to generate reference database 420. One or more embodiments may use any combination of these methods to create or modify the reference database.

Figure 5:
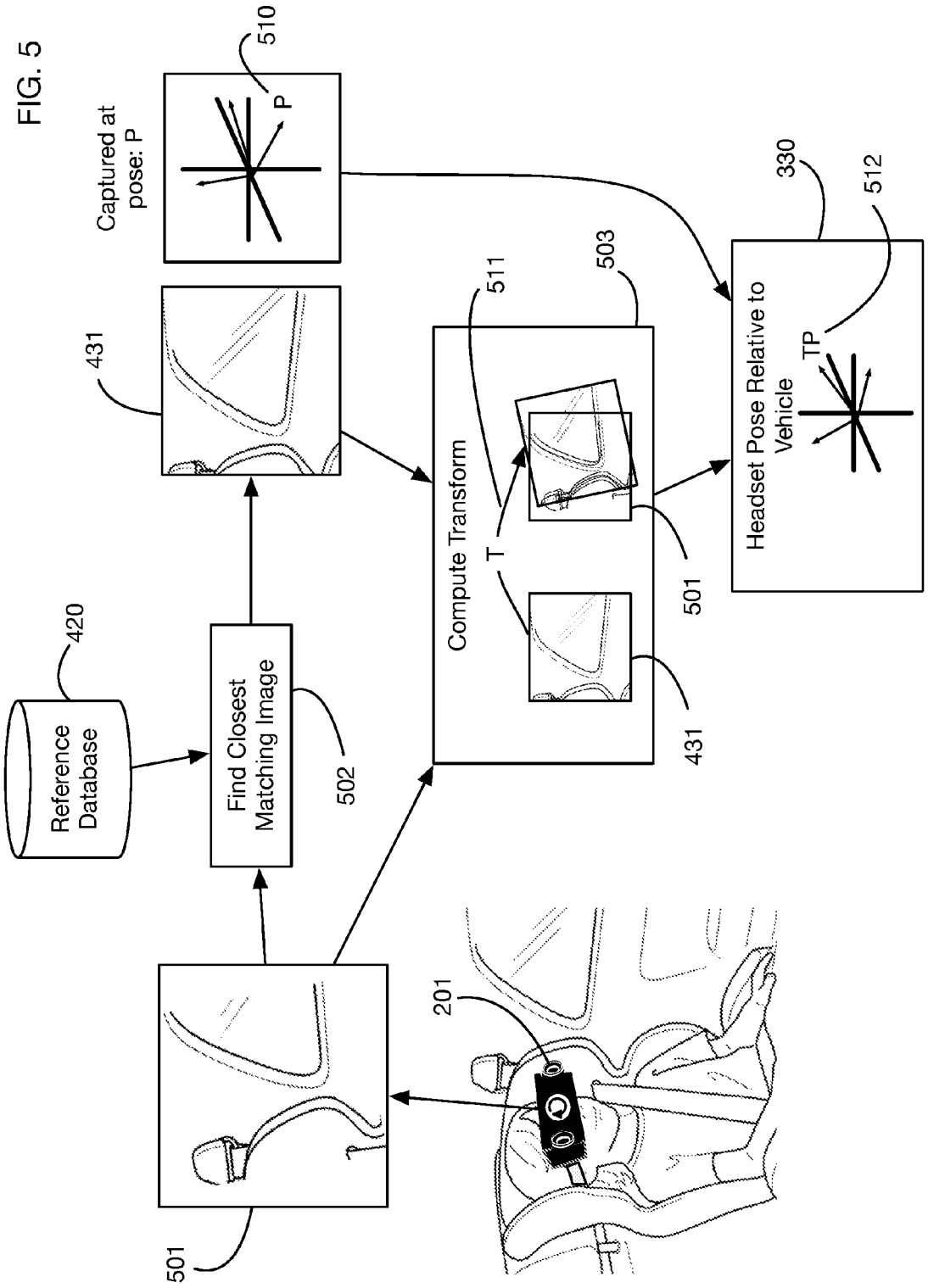
FIG. 5 illustrates an embodiment of the system that uses reference images (as shown for example in FIG. 4) to determine the orientation or position of the headset relative to the vehicle.

FIG. 5 shows an example of using the reference database 420 to determine the pose of the virtual reality headset relative to the vehicle. Camera 201 on the headset captures an image 501 of the interior. The system then searches database 420 to find 502 a closest matching image 431. The image 431 is retrieved along with the pose 510 (P) at which this reference image 431 was captured. Calculation 503 then computes a transform 511 (T) that maps the reference image 431 into the current image 501. This transform may be for example a planar homography, and it may be estimated using techniques known in the art to compute a homography between two images of the same scene taken from different perspectives. This transform T may then be applied to the pose P associated with reference image 431 to obtain 330 the pose 512 (TP) of the headset relative to the vehicle.

Figure 6:
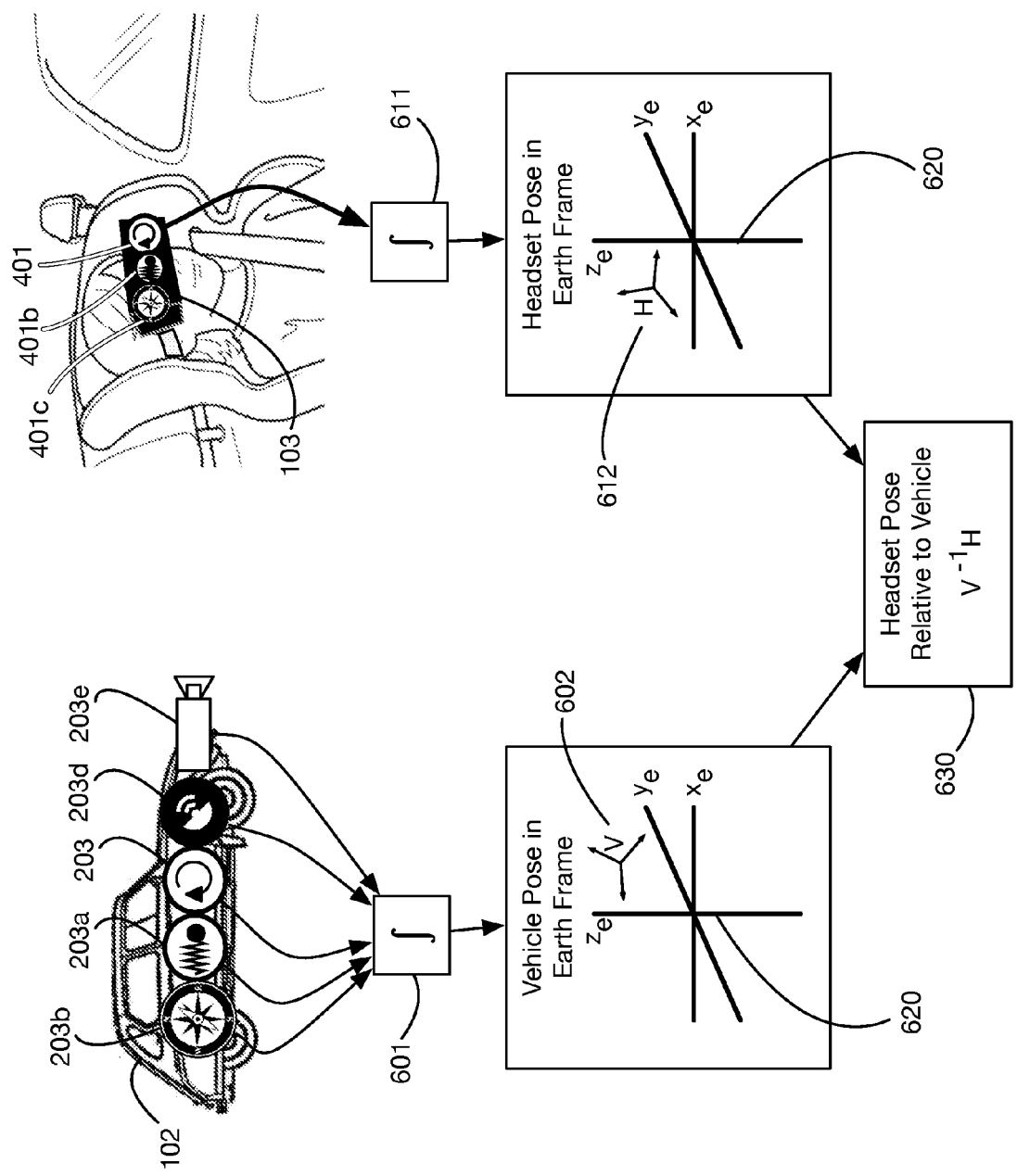
FIG. 6 illustrates an embodiment of the system that combines data from sensors on the headset and sensors on the vehicle to determine the position or orientation of each relative to an external reference frame, and that thereby calculates headset motion relative to the vehicle.

Instead of or in addition to using sensor(s) like headset mounted camera(s) to directly measure the headset pose relative to the vehicle, one or more embodiments may derive the relative pose from the pose of the headset and the pose of the vehicle relative to a third external reference frame. FIG. 6 illustrates an example of this approach. Vehicle 102 is equipped with one or more sensors, including for example any combination of gyroscope 203, accelerometer 203a, magnetometer 203b, GPS receiver 203d, and vehicle camera 203e. These sensors may for example be used individually or in combination to measure the pose of the vehicle relative to an external reference frame such as an Earth reference frame. For example, techniques to integrate inertial sensor data to derive pose in an inertial frame are known in the art. One or more embodiments of the system may integrate 601 or otherwise combine vehicle sensor data to calculate the pose 602 of the vehicle relative to an external frame such as Earth reference frame 620. Similarly, headset 103 may be equipped with one or more sensors, including for example any combination of gyroscope 401, accelerometer 401b, magnetometer 401c, and any other sensors such as GPS or cameras. These headset sensors may be used individually or in combination to measure the pose of the headset relative to an external reference frame such as an Earth reference frame. Integration 611 of this data may calculate the pose 612 of the headset relative for example to Earth reference frame 620. The system may then combine vehicle pose 602 and headset pose 612 to calculate the headset pose relative to the vehicle 630. For example, if transformation V (602) maps coordinates from a vehicle frame to an Earth frame, and if transformation H (612) maps coordinates from a headset frame to an Earth frame, then transformation $V^{-1}H$ maps coordinates from a headset frame to a vehicle frame, as is known in the art. This transformation $V^{-1}H$ therefore represents the pose 630 of the headset relative to the vehicle.

Figure 7:
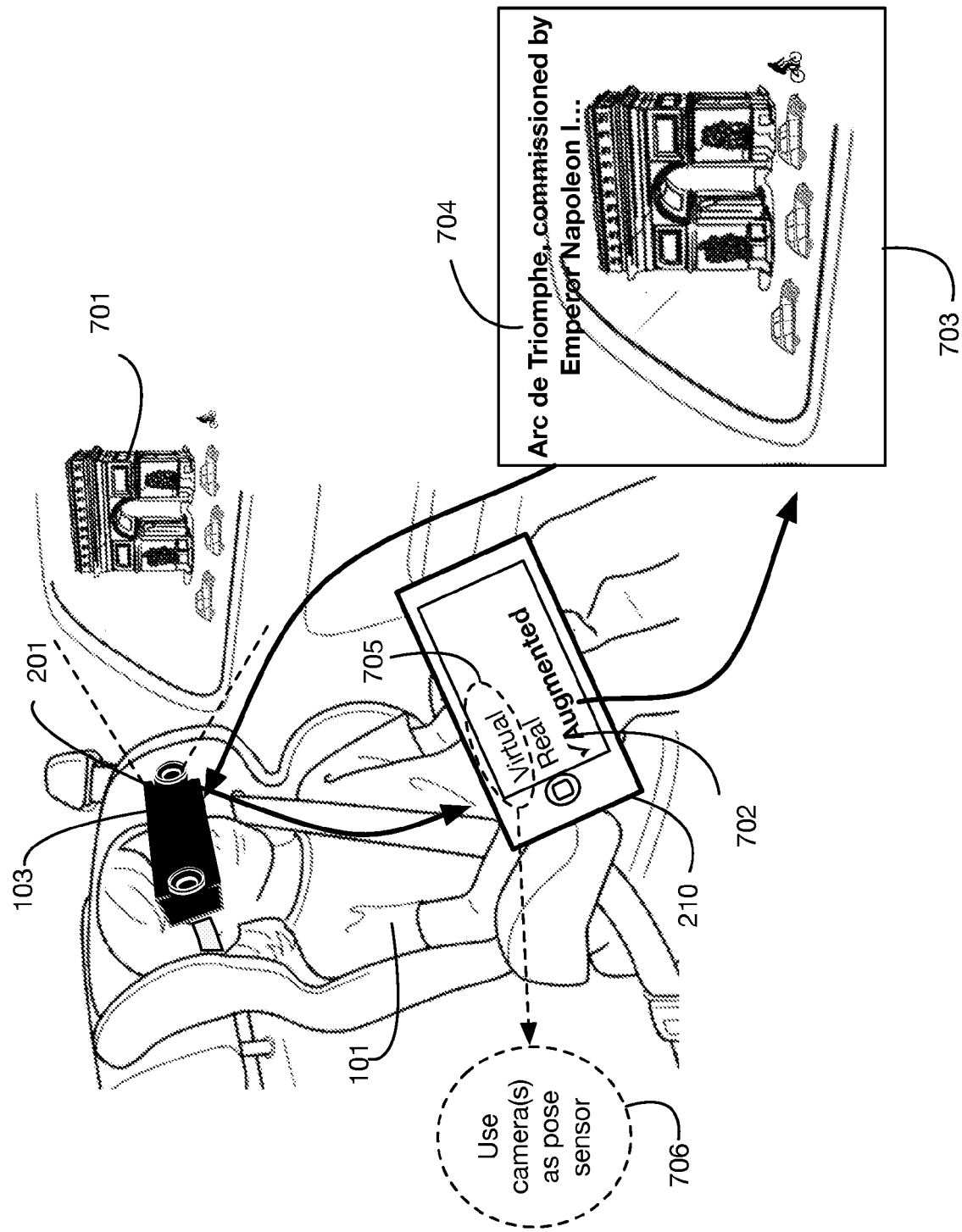
FIG. 7 illustrates an embodiment that uses a headset-mounted camera for dual purposes: the camera functions as a pose sensor in virtual reality mode (as illustrated in FIGS. 3-5), while in augmented reality mode camera images are displayed to the user along with an annotation.

In one or more embodiments a camera or cameras mounted on the headset may provide images viewable by the user in certain modes, in addition to acting as a sensor for the pose of the headset relative to the vehicle. A camera may therefore provide dual functions of pose detection and display of a real scene viewed by the camera. FIG. 7 illustrates an embodiment that uses a headset-mounted camera for these two purposes. The headset and camera configuration of FIG. 7 is as shown in FIG. 3; headset 103 worn by user 101 includes camera 201. In the embodiment of FIG. 7 however, the system supports multiple modes of operation, indicated on device 210. In "virtual" mode 705, the system generates a virtual reality display as shown for example in FIG. 2. In this mode the camera 201 acts as a pose sensor 706, as described above and as illustrated in FIGS. 3, 4, and 5. In "real" mode images from the camera 201 are displayed directly on the headset display. In "augmented" mode the system may alter the images captured by the camera. These alterations may for example provide overlays of text or graphics onto images. These overlays may provide additional information about the objects viewed in a scene. For the example shown in FIG. 7, the user has selected augmented mode 702. The camera 201 is observing a scene 701 outside the car window. The camera image is sent to device 210, which analyzes the objects in the scene and adds annotation 704. This annotated image 703 is then sent to the display of headset 103.

When a vehicle undergoes a large acceleration, for example when braking quickly or going around a sharp curve, the user's head may move unintentionally. For example, a sudden deceleration may cause the user's head to pitch forward and down, and a sudden acceleration may cause the user's head to pitch backwards. These unintentional head motions change the pose of a headset relative to the vehicle, and could therefore affect the viewpoint for rendering of a virtual scene. This effect may be undesirable, since the user generally expects the viewpoint to change only in response to his or her deliberate head movements. Therefore, one or more embodiments may identify large accelerations of a vehicle and temporarily suspend pose updates during those large accelerations. FIG. 8 illustrates an embodiment with this feature. User 101b is located in moving vehicle 102; the user wears virtual reality headset 103. Vehicle 102 makes a sudden stop, which causes the head of user 101b to pitch forward, changing the orientation of the user's head (and hence of the headset) from 801a (level) to 801b (tilted down). Without compensation for this vehicle acceleration, this tilt of the user's head would update the display 110a; the user would for example be looking down at the ground instead of looking out at the scene. The embodiment of FIG. 8 prevents this undesired effect by compensating for large accelerations of vehicle 102. This embodiment measures the vehicle acceleration using an accelerometer 203a. One or more embodiments may measure any aspect of vehicle acceleration on any axis or axes, using any type of sensor or sensors. For example, a GPS may be used to calculate acceleration by taking the second derivative of position. The horizontal acceleration 802 of the vehicle is analyzed by the system in FIG. 8. In this example, a normal range 804 is defined for this acceleration, which may correspond for example to little or no horizontal acceleration. While acceleration is in this normal range 804, relative pose updates are calculated and the display on the headset is updated accordingly. Due to the sudden braking of the vehicle 102, the acceleration crosses threshold 803 (which is negative since the vehicle is stopping) at time $t_1$ and goes into range 806, which is considered excessive vehicle acceleration in this example. In this example excessive acceleration may be either positive in range 805 or negative in range 806. One or more embodiments may define any desired normal range or ranges for acceleration on any axis or on any combination of axes. When the acceleration 802 reaches threshold 803, the system suspends pose updates and freezes 807 the headset pose used for rendering. Thus the display image 110*a* does not change as a result of the change of the user's pose from 801*a* to 801*b*. (Changes may still occur in the display based on the dynamics of the virtual world, but the user's viewpoint is fixed while the acceleration is outside the normal range 804.) When the vehicle acceleration 802 returns to the normal range 804 at time $t_2$, the system resumes pose updates 808 so that the display reflects the headset pose relative to the vehicle. One or more embodiments may add hysteresis or delays to resume pose updates at a time interval after the acceleration returns to the normal range, for example to allow the user to adjust the head position after the acceleration has stopped.

The embodiment illustrated in FIG. 8 uses a vehicle-mounted sensor to determine the vehicle acceleration. One or more embodiments may determine or estimate the vehicle acceleration using one or more sensors on the headset, instead of or in addition to sensors on the vehicle. For example, an accelerometer on the headset may be used to sense vehicle acceleration. Since headset acceleration is affected by both vehicle acceleration and changes in the headset pose relative to the vehicle (such as the user turning his or her head), one or more embodiments may calculate vehicle acceleration by effectively subtracting the local acceleration of the headset relative to the vehicle from the acceleration of the headset relative to an inertial or external reference frame.

While the invention herein disclosed has been described by means of specific embodiments and applications thereof, numerous modifications and variations could be made thereto by those skilled in the art without departing from the scope of the invention set forth in the claims.

What is claimed is:

1. A virtual reality headset with a relative motion head tracker, comprising
    a headset coupled to a head of a user, wherein said user is located in or on a vehicle that may move;
    a display coupled to said headset and viewable by said user; and,
    a relative motion head tracker comprising
        one or more sensors that generate sensor data, wherein said sensor data measures one or more characteristics that vary based on one or both of a pose of said headset and a pose of said vehicle; and,
        a processor coupled to said one or more sensors and to said display;
        wherein said processor is configured to
            receive said sensor data;
            calculate a pose of said headset relative to said vehicle from said sensor data;
            generate, retrieve, select, or modify a display image based on said pose of said headset relative to said vehicle; and,
            transmit said display image to said display;
        wherein said one or more characteristics comprise an acceleration of said vehicle on at least one axis; and,
        wherein said processor is further configured to
            when said acceleration of said vehicle is outside a normal range, generate, retrieve, select, or modify said display image based on a last pose of said headset relative to said vehicle that was calculated when said acceleration of said vehicle was in said normal range.

2. The virtual reality headset with a relative motion head tracker of claim 1, wherein said vehicle comprises a car, a truck, a bus, a motorcycle, a sidecar, a carriage, a train, a subway, a trolley, a tram, an airplane, a balloon, a dirigible, a hang glider, a space station, a space ship, a rocket, a boat, or a submarine.

3. The virtual reality headset with a relative motion head tracker of claim 1, wherein
    said one or more sensors comprise a camera coupled to said headset and oriented to capture a time series of images of at least a portion of said vehicle; and,
    said calculate a pose of said headset relative to said vehicle from said sensor data comprises
        analyze said time series of images to determine said pose of said headset relative to said vehicle.

4. The virtual reality headset with a relative motion head tracker of claim 3, wherein
    said analyze said time series of images comprises
        calculate an optical flow of said time series of images; and,
        derive an egomotion of said camera from said optical flow.

5. The virtual reality headset with a relative motion head tracker of claim 3, wherein
    said analyze said time series of images comprises
        compare an image of said time series of images to one or more reference images of said vehicle, each associated with a reference pose of said headset relative to said vehicle;
        calculate a pose transformation that aligns said image with a selected reference image of said one or more reference images; and,
        calculate said pose of said headset relative to said vehicle by applying said pose transformation to said reference pose associated with said selected reference image.

6. The virtual reality headset with a relative motion head tracker of claim 5, further comprising
    one or more reference pose sensors configured to measure said reference pose associated with each of said one or more reference images; and,
    a reference image acquisition system configured to
        capture said one or more reference images using said camera;
        for each of said one or more reference images, obtain a corresponding reference pose from said one or more reference pose sensors; and,
        store each of said one or more reference images and its corresponding reference pose in a reference image database.

7. The virtual reality headset with a relative motion head tracker of claim 1, wherein
    said one or more sensors comprise
        one or more vehicle pose sensors that measure a pose of said vehicle relative to an external reference frame; and,
        one or more headset pose sensors that measure a pose of said headset relative to said external reference frame; and,
    said processor is configured to calculate said pose of said headset relative to said vehicle based on said pose of said headset relative to said external reference frame and on said pose of said vehicle relative to said external reference frame.

8. The virtual reality headset with a relative motion head tracker of claim 7, wherein
    said external reference frame is an inertial reference frame; and,
    said one or more headset pose sensors comprise one or more of a headset accelerometer;
a headset gyroscope;
a headset magnetometer; and,
a headset GPS.

9. The virtual reality headset with a relative motion head tracker of claim 7, wherein said one or more vehicle pose sensors comprise one or more of
a vehicle accelerometer;
a vehicle gyroscope;
a vehicle magnetometer;
a vehicle GPS; and,
a vehicle camera coupled to said vehicle and oriented to capture images of a surroundings of said vehicle.

10. The virtual reality headset with a relative motion head tracker of claim 3, wherein
said processor is further configured to operate in a virtual mode or in a real mode; and,
when said processor is operating in said real mode, said processor transmits at least a portion of said time series of images to said display coupled to said headset.

11. The virtual reality headset with a relative motion head tracker of claim 10, wherein
said processor is further configured to operate in an augmented reality mode; and,
when said processor is operating in said augmented reality mode, said processor
modifies said at least a portion of said time series of images, forming augmented images; and,
transmits said augmented images to said display coupled to said headset.

12. A virtual reality headset with a relative motion head tracker, comprising
a headset coupled to a head of a user, wherein said user is located in or on a vehicle that may move;
a display coupled to said headset and viewable by said user; and,
a relative motion head tracker comprising
one or more sensors that generate sensor data, wherein said sensor data measures one or more characteristics that vary based on one or both of a pose of said headset and a pose of said vehicle; and,
a processor coupled to said one or more sensors and to said display;
wherein said processor is configured to
receive said sensor data;
calculate a pose of said headset relative to said vehicle from said sensor data;
generate, retrieve, select, or modify a display image based on said pose of said headset relative to said vehicle; and,
transmit said display image to said display;
wherein said one or more sensors comprise a camera coupled to said headset and oriented to capture a time series of images of at least a portion of said vehicle;
wherein said calculate a pose of said headset relative to said vehicle from said sensor data comprises
analyze said time series of images to determine said pose of said headset relative to said vehicle; and,
wherein said analyze said time series of images comprises
compare an image of said time series of images to one or more reference images of said vehicle, each associated with a reference pose of said headset relative to said vehicle;
calculate a pose transformation that aligns said image with a selected reference image of said one or more reference images; and,
calculate said pose of said headset relative to said vehicle by applying said pose transformation to said reference pose associated with said selected reference image.

13. The virtual reality headset with a relative motion head tracker of claim 12, wherein said vehicle comprises a car, a truck, a bus, a motorcycle, a sidecar, a carriage, a train, a subway, a trolley, a tram, an airplane, a balloon, a dirigible, a hang glider, a space station, a space ship, a rocket, a boat, or a submarine.

14. The virtual reality headset with a relative motion head tracker of claim 12, wherein said analyze said time series of images comprises
calculate an optical flow of said time series of images; and,
derive an egomotion of said camera from said optical flow.

15. The virtual reality headset with a relative motion head tracker of claim 12, further comprising
one or more reference pose sensors configured to measure said reference pose associated with each of said one or more reference images; and,
a reference image acquisition system configured to
capture said one or more reference images using said camera;
for each of said one or more reference images, obtain a corresponding reference pose from said one or more reference pose sensors; and,
store each of said one or more reference images and its corresponding reference pose in a reference image database.

16. The virtual reality headset with a relative motion head tracker of claim 12, wherein
said one or more sensors comprise
one or more vehicle pose sensors that measure a pose of said vehicle relative to an external reference frame; and,
one or more headset pose sensors that measure a pose of said headset relative to said external reference frame; and,
said processor is configured to calculate said pose of said headset relative to said vehicle based on said pose of said headset relative to said external reference frame and on said pose of said vehicle relative to said external reference frame.

17. The virtual reality headset with a relative motion head tracker of claim 16, wherein
said external reference frame is an inertial reference frame; and,
said one or more headset pose sensors comprise one or more of
a headset accelerometer;
a headset gyroscope;
a headset magnetometer; and,
a headset GPS.

18. The virtual reality headset with a relative motion head tracker of claim 16, wherein
said one or more vehicle pose sensors comprise one or more of
a vehicle accelerometer;
a vehicle gyroscope;
a vehicle magnetometer;
a vehicle GPS; and,
a vehicle camera coupled to said vehicle and oriented to capture images of a surroundings of said vehicle.

19. The virtual reality headset with a relative motion head tracker of claim 12, wherein said processor is further configured to operate in a virtual mode or in a real mode; and,
when said processor is operating in said real mode, said processor transmits at least a portion of said time series of images to said display coupled to said headset.

20. The virtual reality headset with a relative motion head tracker of claim 19, wherein
said processor is further configured to operate in an augmented reality mode; and,
when said processor is operating in said augmented reality mode, said processor
modifies said at least a portion of said time series of images, forming augmented images; and,
transmits said augmented images to said display coupled to said headset.

21. The virtual reality headset with a relative motion head tracker of claim 12, wherein
said one or more characteristics comprise an acceleration of said vehicle on at least one axis; and,
said processor is further configured to
when said acceleration of said vehicle is outside a normal range, generate, retrieve, select, or modify said display image based on a last pose of said headset relative to said vehicle that was calculated when said acceleration of said vehicle was in said normal range.

22. A virtual reality headset with a relative motion head tracker, comprising
a headset coupled to a head of a user, wherein said user is located in or on a vehicle that may move;
a display coupled to said headset and viewable by said user;
a relative motion head tracker comprising
one or more sensors that generate sensor data, wherein said sensor data measures one or more characteristics that vary based on one or both of a pose of said headset and a pose of said vehicle; and,
a processor coupled to said one or more sensors and to said display;
wherein said processor is configured to
receive said sensor data;
calculate a pose of said headset relative to said vehicle from said sensor data;
generate, retrieve, select, or modify a display image based on said pose of said headset relative to said vehicle; and,
transmit said display image to said display;
wherein said one or more sensors comprise a camera coupled to said headset and oriented to capture a time series of images of at least a portion of said vehicle;
wherein said calculate a pose of said headset relative to said vehicle from said sensor data comprises
analyze said time series of images to determine said pose of said headset relative to said vehicle;
wherein said analyze said time series of images comprises
compare an image of said time series of images to one or more reference images of said vehicle, each associated with a reference pose of said headset relative to said vehicle;
calculate a pose transformation that aligns said image with a selected reference image of said one or more reference images; and,
calculate said pose of said headset relative to said vehicle by applying said pose transformation to said reference pose associated with said selected reference image;
one or more reference pose sensors configured to measure said reference pose associated with each of said one or more reference images; and,
a reference image acquisition system configured to
capture said one or more reference images using said camera;
for each of said one or more reference images, obtain a corresponding reference pose from said one or more reference pose sensors;
store each of said one or more reference images and its corresponding reference pose in a reference image database.

* * * * *